3,293,789
FISHING ROD HOLDER
John D. Pack, 365 Halton Road,
Fort Worth, Tex. 76100
Filed May 9, 1966, Ser. No. 548,738
1 Claim. (Cl. 43—15)

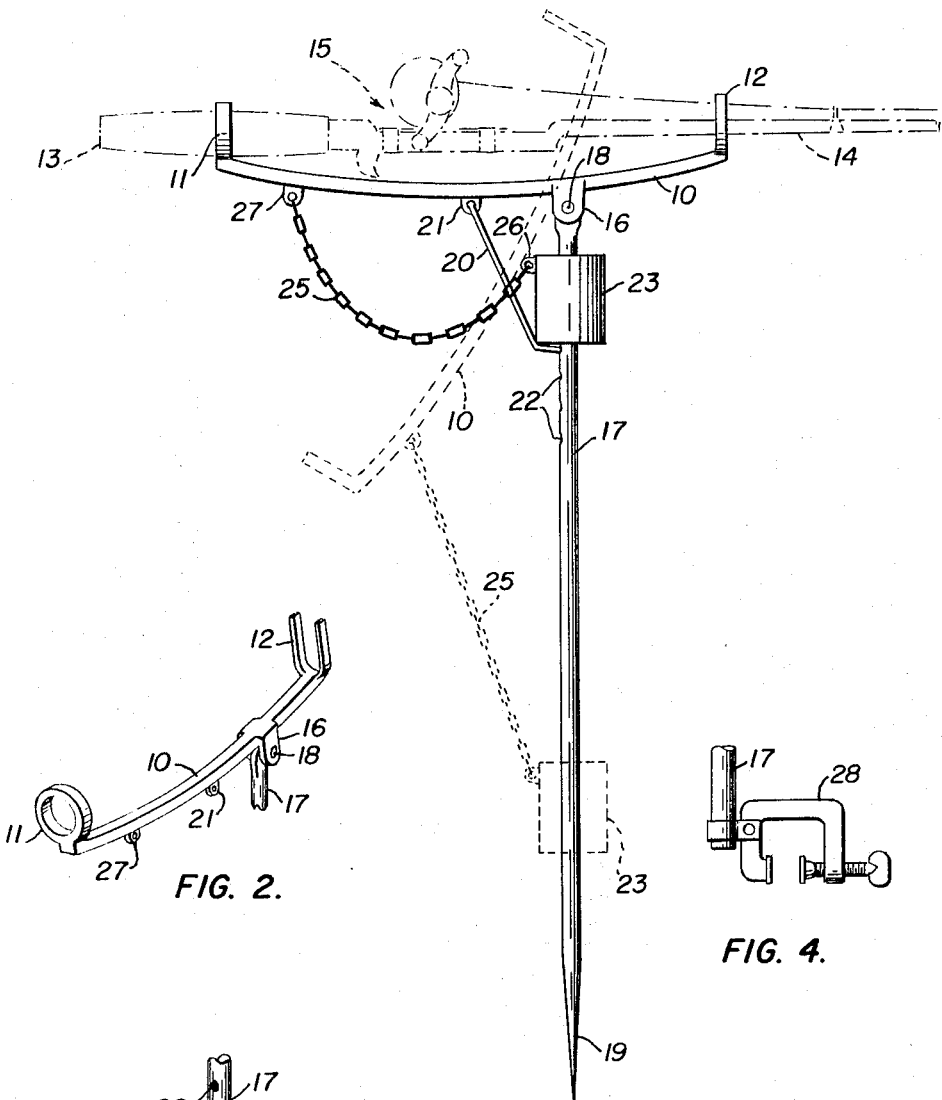

This invention relates to still fishing and has reference to that type of fishing rod or fishing pole holder which will automatically and quickly swing upwardly when a fish takes the bait, thereby setting the hook in the fish's mouth.

The primary object of the invention is to provide a fishing rod or pole holder of simple construction and one which is dependable in its operation.

A particular object of the invention is to provide a holder which has a momentary delay in its action between the time the fish first takes the bait and the setting of the hook, thus allowing sufficient time for the fish to take the baited hook well into its mouth.

A further object is to provide a simple and economical construction wherein the actuating element is a falling weight.

A further object is to provide means whereby the referred to time delay may be selectively adjusted.

A still further object is to provide a holder wherein the rod or pole held by the holder may be easily adjusted to a desired angle with reference to the horizontal.

These and other objects of the invention will become apparent from the following description and the accompanying drawing, wherein:

FIGURE 1 is a side elevational view of a holder according to the invention and showing, by means of dotted lines, a fishing rod positioned therein. Also by means of dotted lines, the holder lever is shown in its tilted position as occurs when the trigger mechanism has been released and the actuating weight has fallen.

FIGURE 2 is a broken perspective view of the holding lever pivotally mounted on the upper end of the post.

FIGURE 3 is a perspective view of the actuating weight which is slidably mounted on the post, and FIGURE 4 is a broken elevational view of an alternate construction employing clamp instead of a pointed end for holding the post in an upright position.

As shown in FIGURES 1 and 2, the invention includes a lever 10 having an upstanding loop 11 at one end and an upstanding fork 12 at the other end. The loop 11 loosely receives the rod handle 13 whereas the fork 12 receives the inner end portion of a rod 14 of a rod and reel 15. In this position the weight of the extending length of the rod 14 causes the handle 13 to bear against the upper inner surface of the loop 11. To those versed in the art it will be obvious that a hook, not shown, could take the place of the loop 11 and have the same function. A depending clevis 16 on the lever 10 relatively near the fork 12 pivotally engages the upper end of a post 17 by means of a pin 18 passing therethrough, which post is in the form of a vertically disposed rod having a pointed lower end 19.

The location of the clevis 16 relative to the fork 12 is such, when the rod 15 is in place, that the lever 10 is nearly balanced but the rear or end including the looper 11 is heavier than the remaining end. The heavier end of the lever is normally supported by a heavy steel wire, herein referred to as the trigger 20, one end of which is pivotally connected with a depending ear 21 on the lever 10, whereas the remaining end of the trigger is bent forwardly to engage one hole of a vertical row of holes 22 in the opposing surface of the post 17.

Slidably mounted on the post 17 there is a weight 23 which may be of any desired shape but is shown as a cylinder having an axial opening 24 for receiving the post. A chain 25 connects the weight 23 with the lever 10 near its rear end by an ear 26 on the weight and a depending ear 27 on the lever.

The construction illustrated in FIGURE 4 is like the foregoing except the pointed end 19 of the post 17 is eliminated and instead a C-clamp 28 is connected to the lower end of the post by a bracket 29. Thus, instead of driving the post 17 in the ground it may be supported otherwise, for example on the gunwale of a boat.

In operation, the rod and reel 15 is supported on the lever 10 as described in the foregoing and the weight 23 is supported by the trigger 20 which is engaged in one of the holes 22. The baited and weighted hook and line, not shown, are then dropped in the water in the usual manner. When the fish first takes the bait the slight downward pull on the rod 14 causes the lever 10 to tilt downwardly and thereby release the trigger 20 and allows the weight 23 to fall. The falling weight, by reason of its connection with the rear of the lever 10 by the chain 25, causes the rod 14 to jerk upwardly, thereby setting the hook in the fish's mouth. The rod and reel 15 is then easily lifted from the fork 12 and removed from the loop 11.

The invention is not limited to the exemplary constructions herein shown and described, but may be made in various ways within the scope of the appended claim.

What is claimed is:

A fishing rod holder comprised of: a post, a lever having forward and rear ends, pivot means connecting said lever to said post at a location on said lever nearer the forward end of said lever than the rear end thereof, handle engaging means on the rear end of said lever and rod engaging means on the forward end of said lever, an elongate trigger pivotally connected at one end to said lever rearwardly of said pivot means, at least one hole in the rear surface of said post and located to receive the extending end of said trigger when said lever is in a generally horizontal position, a weight slidably mounted on said post and supported by said trigger when the latter is engaged in said hole, and a flexible connection connecting said weight with the rear portion of said lever.

References Cited by the Examiner

UNITED STATES PATENTS

| 2,289,592 | 7/1942 | Riedi | 248—42 |
| 2,442,357 | 6/1948 | Hamman | 248—42 |
| 2,472,059 | 6/1949 | Arwood | 248—42 |
| 2,642,690 | 7/1953 | Soenksen | 43—15 |
| 2,661,563 | 12/1953 | Adams et al. | 43—16 |
| 2,835,065 | 5/1958 | Schwartzkojif | 43—15 |
| 2,985,414 | 5/1961 | Ince | 248—42 |

CLAUDE A. LE ROY, *Primary Examiner.*